United States Patent [19]

Quinn

[11] Patent Number: 4,661,544
[45] Date of Patent: Apr. 28, 1987

[54] HOMOGENEOUS STABILIZER COMPOSITIONS FOR VINYL HALIDE POLYMERS

[75] Inventor: Robert E. Quinn, Cleveland, Ohio

[73] Assignee: The Lubrizol Corporation, Wickliffe, Ohio

[21] Appl. No.: 811,210

[22] Filed: Dec. 20, 1985

[51] Int. Cl.$^4$ ............................................. C08K 5/15
[52] U.S. Cl. ................. 524/109; 252/400.61; 252/400.62; 260/414; 524/114; 524/327; 524/399
[58] Field of Search ............... 524/109, 114, 327, 399; 260/414; 252/400 R, 389.61, 389.62, 400.61, 400.62

[56] References Cited

U.S. PATENT DOCUMENTS

| | | | |
|---|---|---|---|
| 2,015,115 | 9/1935 | Kyrides | 568/650 |
| 2,616,904 | 11/1952 | Asseff et al. | 260/399 |
| 2,760,970 | 8/1956 | Le Suer | 260/429 |
| 2,767,164 | 10/1956 | Asseff et al. | 260/139 |
| 2,798,852 | 7/1957 | Wiese et al. | 252/42.7 |
| 2,802,816 | 8/1957 | Asseff et al. | 260/139 |
| 2,881,206 | 4/1959 | Kjonaas et al. | 252/400.61 |
| 2,968,642 | 1/1961 | Le Suer | 260/45.75 |
| 2,971,014 | 2/1961 | Mastin | 260/398 |
| 2,989,463 | 6/1961 | Mastin | 252/25 |
| 3,027,325 | 3/1962 | McMullen et al. | 252/33 |
| 3,031,284 | 4/1962 | Andress, Jr. | 44/76 |
| 3,194,823 | 7/1965 | Le Suer et al. | 260/414 |
| 3,342,733 | 9/1967 | Robbins et al. | 252/33 |
| 3,533,975 | 10/1970 | Scullin | 260/23 |
| 3,630,979 | 12/1971 | Pollock | 252/400.61 |
| 3,773,664 | 11/1973 | Le Suer | 252/40.7 |
| 3,779,922 | 12/1973 | Le Suer | 252/34.7 |
| 4,159,973 | 7/1979 | Hoch et al. | 260/23 |
| 4,177,187 | 12/1979 | Bohen | 524/180 |
| 4,252,698 | 2/1981 | Ho et al. | 260/18 |
| 4,401,779 | 8/1983 | Bae et al. | 524/114 |

FOREIGN PATENT DOCUMENTS 0047894  11/1985  European Pat. Off. .

*Primary Examiner*—Veronica P. Hoke
*Attorney, Agent, or Firm*—Forrest L. Collins; Joseph P. Fischer; Denis A. Polyn

[57] ABSTRACT

In accordance with the present invention, it has been found that liquid stabilizer compositions for vinyl halide polymers that are compatible with and form stable mixtures with epoxidized glycerides can be prepared by a process which comprises heating a non-homogeneous mixture comprising (A) at least one epoxidized glyceride, (B) at least one hydrocarbon-soluble, (B-1) basic alkali or alkaline earth metal salt of an alkyl phenol, or (B-2) basic alkali or alkaline earth metal salt of a monocarboxylic acid, and (C) a hydrocarbon diluent, at an elevated temperature until the mixture is homogeneous. Generally, the metal salts are alkaline earth metal salts such as calcium and barium, and the basic alkaline earth metal salt utilized in this system is a salt of an aliphatic monocarboxylic acid prepared in the presence of a phenol promoter. The invention also relates to stabilizer compositions thus prepared and to stabilizer compositions optionally containing (D) substantially neutral polyvalent metal salts of carboxylic acids and/or (E) organic phosphites. Vinyl halide polymer compositions comprising a vinyl halide polymer and a stabilizing amount of the homogeneous stabilizer compositions of the invention also are described and claimed.

49 Claims, No Drawings

HOMOGENEOUS STABILIZER COMPOSITIONS FOR VINYL HALIDE POLYMERS

BACKGROUND OF THE INVENTION

This invention relates to a novel method for the preparation of homogeneous stabilizer compositions for vinyl halide polymers, the stabilizer compositions so prepared, and to vinyl halide polymers stabilized therewith. More particularly, the invention relates to a process for preparing homogeneous compositions comprising epoxidized glycerides such as vegetable oils, and hydrocarbon-soluble basic alkali and alkaline earth metal salts of alkyl phenols and/or monocarboxylic acids.

Many organic polymers, more particularly halogen containing organic polymers are conveniently and economically processed into useful articles of commerce by methods employing heat to melt or soften the polymer. The use of such heat can be and often is detrimental to the polymer, especially where the polymer is exposed to high (100° C. to 200° C.) processing temperatures for any extended period of time. It is well known that many organic polymers, including halogen containing organic polymers, will undergo color changes and various other physical changes upon exposure to high temperatures over a period of time unless properly protected. The color change is gradual but visually perceptable during short-term exposure to high processing temperatures, but on exposure to high processing temperatures the change in color accelerates and becomes greater in intensity. Color changes occuring during the first several minutes of exposure to high processing temperatures are commonly referred to as early color or early discoloration. Avoidance of such early color or early discoloration is particularly important where white or light colored products are to be produced. It is of course also important to prevent or reduce discoloration and deterioration of the organic polymer during extended exposure to high processing temperatures as may be encountered in some processes or fabricating methods.

A variety of stabilizer systems have been suggested and used to inhibit or prevent this deterioration. These stabilizer systems are for the most part presumed to act in such a manner as to neutralize hydrogen halide that is generated to prevent further dehydrohalogenation which could result because of the presence of free hydrogen halide. Among the stabilizer systems that have been suggested and used in the prior art are oil-soluble salts of such metals as barium, cadmium, zinc, zirconium, tin, calcium. Generally, the above metal salt stabilizers are used in combination with one or more organic phosphites.

In many applications, the stabilizer systems incorporated into vinyl halide polymers will contain an auxiliary stabilizer which is an epoxidized vegetable oil, an epoxidized fatty acid, or an ester of an epoxidized fatty acid such as epoxidized soybean oil, epoxidized tall oil, and butyl epoxy stearate.

In the commercial use of stabilizer systems for vinyl halide polymers, has become common practice to prepare mixtures of the various stabilizers which facilitate the handling and storage of the stabilizers. For example, useful stabilizer systems comprising blends of oil-soluble salts of polyvalent metals, organic phosphites, and auxiliary stabilizers such as epoxidized soybean oils are often prepared for use as needed.

A variety of oil-soluble salts of monovalent and polyvalent metals have been utilized as stabilizers for vinyl halide polymers. The metals include the alkali metals, zinc, calcium, tin, barium, aluminum, strontium, zirconium and magnesium. The metal salts may be neutral salts although basic or "overbased" metal salts are preferred since these contain larger amounts of the metal. In some applications, mixtures of neutral and metal basic salts are utilized such as mixtures of neutral cadmium carboxylates with overbased barium phenates, carboxylates and/or sulfonates.

U.S. Pat. No. 4,159,973 describes stabilizer systems for vinyl halide resin compositions which comprise mixtures of (a) specified overbased barium salt complexes that are compatible with epoxidized vegetable oil, (b) a polyvalent metal salt component, (c) at least one organic phosphite, and (d) an aromatic or aliphatic hydrocarbon solvent. Examples of the polyvalent metal salts include cadmium, zinc, zirconium, tin and calcium salts of aromatic as well as aliphatic carboxylic acids. The organic phosphites may be secondary or tertiary aryl, alkyl or alkaryl phosphites. It is reported that vinyl halide resin compositions containing such stabilizer systems are characterized by excellent heat and light stability, color and clarity.

An anti-yellowing additive for stabilizing vinyl chloride polymers is described in U.S. Pat. No. 4,252,698. The additive comprises the mixture of at least one overbased sulfonate or phenolate compound of lithium, sodium, potassium, magnesium, calcium, strontium, barium, zinc, titanium, aluminum, zirconium or tin, and a 1,3-di-ketone compound having about 5 to about 30 carbon atoms or a metal salt thereof wherein the metal may be any one of the metals described above for the overbased sulfonate or phenolate compound.

U.S. Pat. No. 3,194,823 describes barium- and cadmium-containing organic complexes useful in stabilizing halogen-bearing polymeric compositions. In general, the complexes are prepared from a mixture comprising (a) an alcohol, (b) an aliphatic monocarboxylic acid compound, and (c) a mixture of barium and cadmium bases optionally in the presence of a phenol. Such cadmium- and barium-containing basic complexes can be utilized in vinyl halide polymers in combination with other stabilizing agents such as epoxidized soybean oil and organic phosphites.

The polyvalent metal components of the stabilizers which have been utilized for vinyl halide polymers usually contain a barium compound which may be a salt of a monocarboxylic acid such as octanoic acid, neodecanoic acid, or naphthenic acid; a salt of an alkyl phenol such as octyl phenol, nonyl phenol, etc.; or an overbased barium salt complex. The use of overbased barium salt complexes has increased in recent years because the overbased salts contain high amounts of barium such as, for example, 21 to 35% barium or higher.

Overbased barium salt complexes are well known, and various procedures for preparing such overbased barium salt complexes from carboxylic acids, sulfonic acids and alkyl phenols using an acidic gas such as carbon dioxide or sulfur dioxide to reduce the basicity are disclosed in, for example, the following U.S. Pat. Nos.: 2,616,904; 2,760,970; 2,767,164; 2,798,852; 2,802,816; 3,027,325; 3,031,284; 3,342,733; 3,533,975; 3,773,664; and 3,779,922.

While many overbased barium salts such as the overbased barium alkyl phenate complexes described in some of the above patents are effective stabilizers for vinyl halide polymers, they often are incompatible with epoxidized soybean oil and other epoxidized vegetable oils. When the overbased barium compounds are combined, for example, with conventional oil-soluble cadmium and/or zinc carboxylic acid salts and organic phosphites, and the resulting stabilizer system is blended with an epoxidized vegetable oil, the resulting blend generally becomes cloudy as the incompatible components precipitate. Because such blends are not homogeneous, they present handling and storage problems.

U.S. Pat. No. 4,159,973 describes overbased barium salt complexes that are compatible with epoxidized vegetable oils. The barium salts are obtained by forming a reaction mixture that consists essentially of a basic barium compound, an alkyl phenol and an inert organic diluent wherein the mixture contains at least 0.75 mole of alkyl phenol per mole of the barium compound, and the reaction mixture is maintained at a temperature of at least 180° C. while treating it with an acidic gas such as carbon dioxide until the product is substantially neutral. If less than 0.75 mole of alkyl phenol is included in the mixture, and the mixture is treated with carbon dioxide at a temperature below 180° C., the barium compound obtained is reported to be incompatible with epoxidized vegetable oils.

U.S. Pat. No. 4,401,779 issued Aug. 30, 1983 to Bae et al describes homogeneous liquid stabilizer systems which impart heat and light stability to polyvinyl chloride resins. The systems contain as the essential and only stabilizers, a liquid barium carbonate-barium alkyl phenate and a cadmium salt of a branch chain aliphatic carboxylic acid having from about 8 to about 10 carbon atoms, or mixtures thereof in an amount of at least which 85% with up to about 15% of one or more cadmium salts of aromatic carboxylic acids having from about 7 to about 11 carbon atoms and saturated and unsaturated straight chain aliphatic carboxylic acids having from about 12 to about 22 carbon atoms. The barium and cadmium salts are present in amounts sufficient to form a homogeneous liquid.

SUMMARY OF THE INVENTION

In accordance with the present invention, it has been found that liquid stabilizer compositions for vinyl halide polymers that are compatible with and form stable mixtures with epoxidized glycerides can be prepared by a process which comprises heating a non-homogeneous mixture comprising (A) at least one epoxidized glyceride, (B) at least one hydrocarbon-soluble, (B-1) basic alkali or alkaline earth metal salt of an alkyl phenol, or (B-2) basic alkali or alkaline earth metal salt of a monocarboxylic acid, and (C) a hydrocarbon diluent, at an elevated temperature until the mixture is homogeneous. Generally, the metal salts are alkaline earth metal salts such as calcium and barium, and the basic alkaline earth metal salt utilized in this system is a salt of an aliphatic monocarboxylic acid prepared in the presence of a phenol promoter. The invention also relates to stabilizer compositions thus prepared and to stabilizer compositions optionally containing (D) substantially neutral polyvalent metal salts of carboxylic acids and/or (E) organic phosphites. Vinyl halide polymer compositions comprising a vinyl halide polymer and a stabilizing amount of the homogeneous stabilizer compositions of the invention also are described and claimed.

DESCRIPTION OF THE PREFERRED EMBODIMENTS

The liquid homogeneous stabilizer compositions of the present invention are prepared by heating a non-homogeneous mixture which comprises (A) at least one epoxidized glyceride, (B) at least one hydrocarbon-soluble basic alkali or alkaline earth metal salt, and (C) a hydrocarbon diluent at an elevated temperature until the mixture is homogeneous. Non-homogeneous mixtures of such compositions can be rendered homogeneous generally by heating the mixture at temperatures within the range of from above ambient temperature to about 150° C. or higher for periods of from a few minutes to about one or two hours or more. The homogeneous mixture remains homogeneous when cooled to ambient temperature, and remains homogeneous over an extended period of time.

It also has been observed that once the above mixtures are rendered homogeneous, other standard stabilizers for vinyl halide resins can be blended into the homogeneous mixture without destroying the homogenity of the mixture. Examples of standard stabilizer compositions which can be blended into such mixtures and which will be described in more detail hereinafter include (D) substantially neutral metal salts of carboxylic acids and (E) organic phosphites.

The epoxidized glycerides used as component (A) in the mixtures of the invention are derived from glycerides having the general formula

wherein $R_1$, $R_2$ and $R_3$ are each independently hydroxyl or fatty acid groups with the proviso that at least one of $R_1$, $R_2$ and $R_3$ is a fatty acid group. The fatty acids may contain from about 12 to about 30 carbon atoms in the chain, and the acids may be unsaturated acids containing from zero to 3 double bonds.

Preferably the epoxidized glycerides are epoxidized triglycerides where $R_1$, $R_2$ and $R_3$ are the same or different fatty acid groups. The epoxidized triglycerides may be and preferably are epoxidized natural oils such as vegetable, animal and marine oils. Specific examples of epoxidized oils (triglycerides) which are useful as component (A) include epoxidized vegetable oils such as castor oil, coconut oil, corn oil, cottonseed oil, linseed oil, olive oil, palm oil, peanut oil, rapeseed oil, sesame oil, soybean oil, sunflower oil and tung oil; animal oils such as beef tallow and pig fat; and marine oils such as fish oil. Epoxidized vegetable oils, especially epoxidized soybean oil, are particularly preferred. Epoxidized soybean oil is generally used as a stabilizer for vinyl halide polymers.

The second component (B) of the homogeneous mixtures of the present invention may be at least one hydrocarbon-soluble (B-1) basic alkali or alkaline earth metal salt of an alkyl phenol. Throughout the specification, the term "basic" as applied to the alkali or alkaline earth metal salts useful in the mixtures of the present invention is used to refer to metal salt compositions wherein the ratio of total metal contained therein to the organic moieties is greater than a stoichiometric ratio of the neutral metal salt. That is, the number of metal equivalents is greater than the number of equivalents of the organic moiety. Such compositions often have been referred to in the art as "overbased" or "superbased" to indicate an excess of the basic component.

The basic alkali or alkaline earth metal salts of alkyl phenols useful as component (B-1) are known and described in the prior art. Generally, the basic metal salts of alkyl phenols can be prepared by the process comprising preparing a mixture comprising (a) at least one alkyl phenol, and (b) more than one equivalent of at least one alkali or alkaline earth metal base, per equivalent of said phenol (a), and thereafter treating said mixture with an acidic gas until the titratable basicity has been substantially reduced. The titratable basicity of such compositions is determined utilizing a phenolphthalein indicator. Generally, the mixtures are treated with the acidic gas until the titratable basicity is reduced to a base number of below about 10.

The above process for preparing overbased phenates requires no unusual operating conditions. The ingredients are mixed, heated and then treated with the acidic gas. In some instances, the product mixture obtained from this process may contain a small amount of undissolved material which can be removed conveniently, for example, by filtration. Generally, the reactants are heated prior to treatment with the acidic gas, and the mixture may be heated to a temperature sufficient to drive off some of the water contained in the mixture. The treatment of the mixture with the acidic gas preferably is conducted at elevated temperatures, and the range of temperatures required for this step may be any temperature above ambient temperature up to about 200° C., and more preferably from a temperature of about 75° C. to about 200° C. Higher temperatures may be used such as 250° C., but there is no apparent advantage in the use of such higher temperatures. Ordinarily, a temperature of about 150° C. is satisfactory.

The alkyl phenol reactant may be derived from phenol itself or from naphthol, or from other polynuclear phenolic compounds. It may also be a bisphenol such as is obtained from the condensation of an aldehyde with a phenol. The alkyl phenols may contain one or more alkyl groups on the aromatic nucleus, and it is necessary that the number of carbon atoms in the alkyl groups be sufficient to yield oil-soluble overbased metal phenates. Thus, the alkyl groups on the alkyl phenol will contain a total of at least 6 carbon atoms, and generally will contain up to about 150 carbon atoms. If there is only one alkyl group on the alkyl phenol, the alkyl group will contain at least about 6 carbon atoms, but if there are two alkyl groups, the sum of the carbon atoms in the two alkyl groups will equal at least about 6. For example, one alkyl group may contain 2 carbon atoms and the other alkyl group 4 carbon atoms. Specific examples of alkyl groups containing at least 6 carbon atoms include hexyl, isoheptyl, diisobutyl, n-decyl, tetrapropyl, octadecyl, polyisobutyl (derived from polyisobutene fractions of various molecular weights) dedecyl, etc. Specific examples of alkyl phenols which are contemplated for use in the preparation of overbased phenates useful in the process of the present invention include hexylphenol, heptylphenol, octylphenol, dodecylphenol, octadecylphenol, nonylphenol, and higher alkylated phenols; octylnaphthol, dodecylnaphthol, and higher alkylated naphthols; a condensation product of formaldehyde and two moles of octylphenol, or a condensation product of acetone and two moles of heptylphenol, etc.

The alkylphenol compound useful in the preparation of the overbased phenates may contain other groups in addition to the alkyl groups. Thus, halogen, nitro, alkoxy, etc. groups may be present.

The metal bases which are reacted with the alkyl phenols may be alkali or alkaline earth metal bases, although alkaline earth metal bases are preferred. The basic metal compounds include the metal oxides and hydroxides, and in some instances, the sulfides, hydrosulfides, etc. of the alkaline earth metal, calcium and barium are preferred, and the most preferred is barium.

By the term "acidic gas" as used in this specification and in the claims is meant a gas which upon reaction with water will produce an acid. Thus, such gases as sulfur dioxide, sulfur trioxide, carbon dioxide, carbon disulfide, hydrogen sulfide, etc. are exemplary of the acidic gases which are useful in the process of this invention. Of these acids, sulfur dioxide and carbon dioxide are preferred, and the most preferred is carbon dioxide.

As indicated above, the amount of the basic alkali or alkaline earth metal base utilized in the preparation of the overbased phenates is an amount which is more than one equivalent of the base per equivalent of the phenol, and more generally will be an amount sufficient to provide at least three equivalents of the metal base per equivalent of alkyl phenol. Larger amounts can be utilized to form more basic compounds, and the amount of metal base included may be any amount up to that amount which is no longer effective to increase the proportion of metal in the product.

Procedures for preparing basic alkali and alkaline earth metal salts of alkyl phenols are well known in the art and is not believed necessary to unduly lengthen the specification with additional description of the procedures. Examples of patents which describe the preparation of such basic metal phenates include, for example, U.S. Pat. Nos. 2,989,463; 2,968,642; and 2,971,014, the specifications of which are hereby incorporated by reference for the disclosures of the preparation of overbased metal phenates.

The hydrocarbon-soluble basic metal salt useful in the process of the present invention may be (B-2) a basic alkali or alkaline earth metal salt of a monocarboxylic acid. The preparation of such basic salts is known in the art and any of the basic alkali or alkaline earth metal salts of monocarboxylic acids are useful in the process and product of the present invention. Generally, such basic metal salts are obtained by preparing a mixture comprising (a) at least one monocarboxylic acid, (b) more than one equivalent of at least one alkali metal or alkaline earth metal base per equivalent of said acid, and (c) optionally and preferably, at least one promoter selected from the group of aliphatic alcohols, phenols, or mixtures thereof, and thereafter treating said mixture with an acidic gas until the titratable basicity of the mixture has been substantially reduced. The alkali metal and alkaline earth metal bases and the acidic gases described above, also are useful in the preparation of the basic monocarboxylic acids of this invention. As stated previously, the preferred metal bases are the alkaline earth metal bases, and more preferably the calcium and barium metal bases. The preferred acidic gases are sulfur dioxide and carbon dioxide with carbon dioxide being preferred.

The general procedure of preparing and basic metal salts of monocarboxylic acids is similar to the procedure utilized for preparing the basic phenates described above. The reactants are mixed with stirring and generally with heating to insure thorough mixing, and where it is desirable to remove water, the temperature of the mixture is raised to a temperature sufficient to drive off the water such as at a temperature of above 100° C. The step of treating the mixture with an acidic gas also is as described above and is preferably conducted at elevated temperatures such as above 100° C. A particularly convenient method for carrying out the process involves the stirring and heating of the mixture to insure an intimate mixture of reactants, heating this mixture to a temperature above 100° C. to remove some water, and then bubbling an acidic gas through this heated mixture until the titratable basicity of the mixture has been substantially reduced.

The monocarboxylic acids which can be converted to basic metal salts which are useful in the present invention may be aliphatic or aromatic monocarboxylic acids or mixtures thereof. Among the aliphatic monocarboxylic acids which can be utilized in the present invention are the aliphatic monocarboxylic acids containing an average of at least about 6 carbon atoms and more generally an average of from about 6 to about 30 carbon atoms. In most instances the monocarboxylic acid of the aliphatic monocarboxylic acid will be at least one substituted or unsubstituted aliphatic monocarboxylic acid such as n-hexanoic acid, capric acid, caprylic acid, 2-ethylhexanoic acid, undecanoic acid, lauric acid, myristic acid, palmitic acid, stearic acid, oleic acid, linoleic acid, linolenic acid, tung oil acids, tall oil acids, ricinoleic acid, 3,5,5-trimethyl-hexanoic acid, alpha-chlorostearic acid, alphanitrolauric acid, omega-amino-pentadecanoic acid, lauroxy-acetic acid, eicosanoic acid, mono-lauryl adipate, phenyloleic acid, phenylstearic acid, chlorophenylstearic acid, xylylstearic acid, alpha-pyridyloleic acid, tetracosanoic acid, behenic acid, stearolic acid, etc. A preference is expressed for the higher fatty acids such as lauric, palmitic, oleic, linoleic, linolenic, stearic, myristic, palmitic, etc., acids and mixtures of fatty acids containing an average of at least about 12 carbon atoms.

The monocarboxylic acid also may be an aromatic monocarboxylic acid such as alkyl aromatic carboxylic acids and hydroxy-substituted aromatic carboxylic acids. The alkyl aromatic carboxylic acids may contain one or more alkyl groups such as butyl, hexyl, heptyl, octyl, dodecyl, octadecyl, etc. Generally, the total number of carbon atoms in the alkyl group(s) is at least 6 and will generally range from about 6 to about 150 carbon atoms in the alkyl groups. The aromatic carboxylic acids also may contain one or more hydroxyl groups attached to the aromatic moiety. Specific examples of such aromatic carboxylic acids include benzoic acid, salicyclic acid, 4-hexylbenzoic acid, etc.

The preparation of the basic salts of monocarboxylic acids optionally may be conducted in the presence of (c) at least one promoter selected from the group consisting of aliphatic alcohols, phenols, or mixtures thereof. The alcohols which are useful as promoters include any one of the various available substituted or unsubstituted aliphatic or cycloaliphatic alcohols containing from 1 to about 20 or more carbon atoms. In most cases, the alcohol will be unsubstituted, i.e., it will conform to the formula ROH, where R is an aliphatic hydrocarbon radical or cycloaliphatic hydrocarbon radical containing from 1 to 20 carbon atoms. However, in some instances, the alcohol may contain organic and/or inorganic substituents such as aromatic groups, homocyclic groups, heterocyclic groups, and nitro, ether, ester, sulfide, keto, amino, nitroso, etc., groups.

Examples of alcohols useful as promoters include methanol, ethanol, n-propanol, isopropanol, n-butanol, isobutanol, n-pentanol-1, n-pentanol-2, isoamyl alcohol, n-hexanol-1, n-hexanol-2, 4-methylpentanol-2, n-heptanol, primary isooctanol (prepared for example, by the well known Oxo process), 2-ethylhexanol, n-octanol, 3,5,5-trimethyl-hexanol, cyclohexanol, methylcyclohexanol, ethylcyclohexanol, benzyl alcohol, beta-phenethyl alcohol, 2-alpha-pyridyl-ethanol-1, tetrahydrofurfuryl alcohol, 2-cyclohexyl-ethanol-1, n-decanol, lauryl alcohol, isododecanol (prepared for example, by the hydration of triisobutylene), myristyl alcohol, oleyl alcohol, n-eicosanl, n-tricosanol, n-triacontanol, 2-phenoxy-ethanol-1, 2-phenoxyethoxyethanol-1, 6-chloro-n-hexanol-1, 8-nitro-n-octanol-1, 4-aminocyclohexanol, ethylene glycol mono-oleate, glyceryl dipalmitate, 2-n-butoxy-ethanol-1, diethylene glycol mono-ethyl ether, 2-thiobutoxy-ethanol-1, etc. Of the various available alcohols, a preference is expressed for the aliphatic monohydric alcohols. Particularly preferred are the alkanols containing from about 12 to about 18 carbon atoms. In lieu of a single alcohol, mixtures of two or more different alcohols may also be used.

The phenols which are optionally present in the herein-described process as promoters include principally substituted and unsubstituted monohydric or polyhydric phenols. The substituents may be organic and/or inorganic. Examples of such phenols include phenol itself and alkylated and cycloalkylated mononuclear or polynuclear phenols containing from one to 150 or more carbon atoms in the substituent group or groups such as, for example, ortho-, meta-, and para-cresols; xylenols; para-ethylphenol; ortho, para-diethylphenol; n-propylphenol; para-isopropylphenol; tertiary butylphenol; n-amylphenol; para-tertiary amylphenol; para-cyclopentylphenol; cyclohexylphenol; methylcyclohexylphenol; secondary-hexylphenol; heptylphenol; diisobutylphenol; 3,5,5-trimethyl-n-hexylphenol; n-decylphenol; cetylphenol; oleylphenol; wax-alkylated phenol; polyisobutenesubstituted phenol in which the polyisobutene substituent contains from about 20 to about 150 carbon atoms, etc; aryl-substituted phenols such as phenylphenol, diphenylphenol, and naphthylphenol; polyhydroxy aromatic compounds such as alizarin, quinizarin, hydroquinone, catechol, pyrogallol, etc.; monohydroxy naphthalenes such as alpha-naphthol and beta-naphthol; polyhydroxy naphthalenes such as naphthohydroquinone and naphthoresorcinol; alkylated polyhydroxy aromatic compounds such as octylcatechol and mono-(triisobutyl) pyrogallol; and substituted phenols such as para-nitrophenol, picric acid, ortho-chlorophenol, tertiarybutyl chlorophenols, para-nitro ortho-chlorophenol, para-aminophenol, etc. In most instances the phenol, if used, will be a mono-alkyl phenol containing from about 4 to about 12 carbon atoms in the alkyl group. Thus, commercially available mono-alkyl phenols such as para-tertiary butylphenol, heptylphenol, and diisobutylphenol (i.e., tertiary octylphenol) are preferred.

The amount of the alcohol or phenol which is included in the mixture as a promoter is not critical. The promoters are included in the mixture to contribute to the utilization of the acidic gas during treatment of the mixture with the acidic gas. The amount of alcohol present in the mixture prior to treatment with the acidic gas is not critical. However, at least about 0.1 equivalent and preferably from about 0.05 to about 10 equivalents of an alcohol or phenol per equivalent of a monocarboxylic generally is employed. Larger amounts, for example, up to about 20 to about 25 equivalents of alcohol or phenol may be used, especially in the case of lower molecular weight alcohols and phenols. Water, which may optionally also be present in the mixture, may be present as water added as such to the mixture, or the water may be present as "wet alcohol", "wet" phenol, hydrates of the alkali or alkaline earth metal salts, or other type of chemically combined water with the metal salts.

In addition to the components described above, the reaction mixtures used to prepare the basic metal salts ordinarily will contain a diluent. Generally, any hydrocarbon diluent can be employed, and the choice of diluent is dependent in part on the intended use of the mixture. Most generally, the hydrocarbon diluent will be a non-volatile diluent such as the various natural and synthetic oils of lubricating viscosity. The natural oils include animal oils and vegetable oils (e.g., castor oil, lard oil) as well as solvent-refined or acid-refined mineral lubricating oils of the paraffinic, naphthenic or mixed paraffinic-naphthenic types. Kerosene can be used. Synthetic oils include hydrocarbon oils and halo-substituted hydrocarbon oils such as polymerized and interpolymerized olefins (e.g., polybutylenes, polypropylenes, propylene-isobutylene copolymers, chlorinated polybutylenes, etc.). Other classes of synthetic oils include alkylene oxide polymers and interpolymers and derivatives thereof; esters of dicarboxylic acids; silicon-based oils; etc.

It is important that an excess of the alkali metal or alkaline earth metal compound be utilized with respect to the amount of alcohol, alkyl phenol and/or monocarboxylic acid included in the reaction mixture. Thus, if one mole of a carboxylic acid is used, then more than one mole of an alkali metal and more than 0.5 mole of the basic alkaline earth metal compound must be utilized. Preferably, a stoichiometric excess of the alkali or alkaline earth metal compound should be used. As is known in this art, the basicity of the product which results depends upon the amount of such excess alkali or alkaline earth metal compound included in the mixture, and the degree to which excess metal is found in the product may be described in terms of a "metal ratio". Metal ratio as used herein indicates the ratio of total alkali or alkaline earth metal in the oil-soluble composition to the amount of monocarboxylic acid and phenol and/or alcohol used in the process, on an equivalent basis. A composition, for example, having 4 equivalents of barium and 1 equivalent of oleic acid as a metal ratio of 4. An oil-soluble composition having 3.8 equivalents of calcium and 1.9 equivalents of palmitic acid has a metal ratio of 2. As much as 15 or more equivalents of the basic alkali or alkaline earth metal compound, per equivalent of acid or phenol may be employed with success in this process. The preparation of the basic salts of monocarboxylic acids is well known and different procedures have been described in the prior art such as in U.S. Pat. Nos. 3,194,823 and 3,147,232, the disclosures of which are hereby incorporated by reference for their description of such procedures.

The following examples illustrate the preparation of the basic metal salts useful in the invention. Unless otherwise indicated in the following examples and elsewhere in the specification and claims, all parts and percentages are by weight, and temperatures are in degrees centigrade.

EXAMPLE 1

A mixture of 300 grams of mineral oil, 99 grams (0.76 equivalent) of octyl alcohol, 257 grams (3.36 equivalents) of barium oxide, 234 grams (0.81 equivalent) of oleic acid, and 45 grams (5 equivalents) of water is heated with stirring to reflux temperature in about 1 hour. The mixture then is heated to a temperature of 135°–145° C., and maintained at this temperature for a period of about 0.5 hour. This mixture is treated with $CO_2$ (2 cubic ft. per hour) at 145° C. for a period of about 2 hours. The resulting mixture is heated to 190° C. and filtered. The filtrate has the following analysis:

| Sulfate ash | 34.5% |
| --- | --- |
| Metal ratio | 2.9 |
| Neut. No. | 0.4 (acidic). |

EXAMPLE 2

A mixture of 897 grams of mineral oil, 190 grams (1.15 equivalents) of octyl alcohol, 386 grams (4.88 equivalents) of barium oxide, 347 grams (1.22 equivalents) of stearic acid, and 67 grams (7.4 equivalents) of water is heated with stirring to reflux temperature in about 1 hour. The mixture then is heated to a temperature of 145° C., and maintained at this temperature for a period of about 0.5 hour. This mixture is treated with $CO_2$ (2.5 cubic ft. per hour) at 145° C. for a period of about 1.5 hours and then heated to 190° C. and filtered. The filtrate has the following analysis:

| Sulfate ash | 25.87% |
| --- | --- |
| Metal ratio | 3.1 |
| Neut. No. | 0.3 (acidic). |

EXAMPLE 3

A mixture of 2576 grams of mineral oil, 240 grams (1.85 equivalents) of octyl alcohol, 740 grams (20.0 equivalents) of calcium hydroxide, 2304 grams (8 equivalents) of oleic acid, and 392 grams (12.3 equivalents) of methyl alcohol is heated with stirring to a temperature of about 50° C. in about 0.5 hour. This mixture then is treated with $CO_2$ (3 cubic ft. per hour) at 50°–60° C. for a period of about 3.5 hours. The resulting mixture is heated to 150° C. and filtered. The filtrate has the following analysis:

| Sulfate ash | 24.1% |
| --- | --- |
| Metal ratio | 2.5 |
| Neut. No. | 2.0 (acidic). |

EXAMPLE 4

A mixture of 932 grams of mineral oil, 100 grams (0.77 equivalent) of octyl alcohol, 370 grams (10.0 equivalents) of calcium hydroxide, 287 grams (1.0 equivalent) of oleic acid, and 150 grams (4.6 equivalents) of methyl alcohol is heated with stirring to a temperature of about 55° C. in about 0.5 hour. This mixture then is treated with $CO_2$ (2 cubic ft. per hour) at 55° C. for a period of about 6 hours. The resulting mixture is heated to 150° C. and filtered. The filtrate has the following analysis:

| Sulfate ash | 30.6% |
|---|---|
| Metal ratio | 7.5 |
| Neut. No. | 3.0 (basic). |

EXAMPLE 5

A mixture of 1800 grams of mineral oil, 598 grams (4.6 equivalents) of octyl alcohol, 952 grams (18.3 equivalents) of strontium oxide, 1376 grams (4.88 equivalents) of oleic acid, and 249 grams (27.7 equivalents) of water is heated with stirring to the reflux temperature in about 1.5 hours. The mixture is then heated to a temperature of 145° C., and maintained at this temperature for a period of aobut 0.5 hour. This mixture is treated with $CO_2$ (4 cubic ft. per hour) at 145° C. for a period of about 1 hour.

EXAMPLE 6

A mixture of 2926 parts of mineral oil, 300 parts (1.56 equivalents) of heptylphenol and 347 parts (1.64 equivalents) of a mixture of normal $C_{12-18}$ primary alcohols in heated to 132° C. under nitrogen, with stirring. Barium hydroxide monohydrate, 248 parts, is added with stirring over one-half hour while water is collected by distillation. When water evolution has ceased, the mixture is dried for 15 minutes at 137° C. There is then added 713 parts (2.6 equivalents) of a eutectic mixture of palmitic and stearic acids, followed by 1702 parts (total 20.6 equivalents) of barium hydroxide monohydrate, the latter being added portionwise over $3\frac{1}{2}$ hours while water is again removed by distillation. The temperature is increased to 150° C. during the final portion of barium hydroxide addition. The mixture is then blown with carbon dioxide at 150° C. for $2\frac{1}{4}$ hours and purged with nitrogen at 150° C. Finally, a filter aid material is added and the mixture is filtered, yielding a 53% solution in mineral oil of the desired basic barium salt which contains 37.06% barium sulfate ash.

EXAMPLE 7

To a mixture of 142 parts (0.5 equivalent) of stearic acid, 134 parts (0.5 equivalent) of oleyl alcohol, 115 parts (0.6 equivalent) of heptylphenol and 1100 parts of mineral oil is added slowly, at room temperature, 674 parts (8 equivalents) of barium oxide. An exothermic reaction takes place which causes the temperature to rise to 70° C. Water, 101 parts, is added gradually, whereupon the temperature rises to 120° C. The mixture is held for 4 hours at 130°–140° C. and then heated to 160° for one-half hour to remove volatile materials. It is then blown with carbon dioxide at 145°–150° C. until it is neutral to phenolphthalein. Finally, it is filtered using a filter aid material. The filtrate is a 50% solution in mineral oil of the desired basic barium salt containing 34.99% barium sulfate ash.

EXAMPLE 8

A mixture of 368 parts (1.3 equivalents) of oleic acid, 150 parts (0.8 equivalent) of heptylphenol, 260 parts (1.3 equivalents) of tridecyl alcohol, 1515 parts of mineral oil and 32 parts of water is heated to 76° C., and 184 parts of barium hydroxide monohydrate is added over 7 minutes at 76°–92° C. Additional barium hydroxide monohydrate, to a total of 982 parts (10.4 equivalents), is added over about 2 hours. The mixture is then heated at 145°–157° C. and blown with carbon dioxide for 2 hours. After all water has been removed, the product is filtered, yielding a 54% solution in mineral oil of the desired basic barium salt which has a barium sulfate ash content of 36.2%.

EXAMPLE 9

Following the procedure of Example 8, a basic barium salt is obtained from 150 parts (0.8 equivalent) of heptylphenol, 368 parts (1.3 equivalents) of oleic acid, 982 parts (10.4 equivalents) of barium hydroxide monohydrate, 370 parts (1.75 equivalents) of a mixture of normal $C_{12-14}$ primary alcohols, 1405 parts of mineral oil and 32 parts of water. The product contains 36.07% barium sulfate ash.

EXAMPLE 10

Following the procedure of Example 8, a basic barium salt is prepared from 150 parts (0.8 equivalent) of heptylphenol, 368 parts (1.3 equivalent) of oleic acid, 982 parts (10.4 equivalents) of barium hydroxide monohydrate, 324 parts (1.3 equivalents) of oleyl alcohol, 1451 parts of mineral oil and 32 parts of water. The product, a 56% solution in mineral oil, contains 35.65% barium sulfate ash.

EXAMPLE 11

Following the procedure of Example 8, a basic barium salt is prepared from 720 parts (2.6 equivalents) of tall oil acid, 300 parts (1.56 equivalents) of heptylphenol, 1900 parts (20.1 equivalents) of barium hydroxide monohydrate, 374 parts (1.64 equivalents) of a mixture of normal $C_{12-18}$ primary alcohols and 65 parts of water. The product, a 53% solution in mineral oil of the desired basic salt, contains 37.79% barium sulfate ash.

EXAMPLE 12

A mixture of 300 parts (1.56 equivalents) of heptylphenol, 347 parts (1.64 equivalents) of a mixture of normal $C_{12-18}$ primary alcohols and 2000 parts of mineral oil is heated to 100°–105° C., and 1960 parts (20.7 equivalents) of barium hydroxide monohydrate is added over 18 minutes. The mixture is heated to 150° C. and water is collected by distillation. After 98 parts of water have been collected, 360 parts of tall oil acid is added over 20 minutes. Water distillation is continued for $2\frac{1}{2}$ hours, and then an additional 360 parts (total 2.6 equivalents) of tall oil acid is added. After an additional one-half hour of heating, the mixture is blown with carbon dioxide at 145°–150° C. for 3 hours. The mixture is purged with nitrogen until substantially all volatile matter has been removed and then 1098 parts of mineral oil is added and the mixture is filtered, using a filter aid material. The filtrate is the desired 51% solution of a basic barium salt containing 36.6% barium sulfate ash.

EXAMPLE 13

A mixture of 225 parts of mineral oil and 100 parts of dodecylphenol is prepared, purged with nitrogen and heated to about 90° C. whereupon 214.6 parts of barium hydroxide monohydrate are added over a period of about 1 hour. The mixture then is heated to about 150°

C. and treated with carbon dioxide while maintaining the temperature at about 150°-155° C. for about 2 hours while removing water. After all of the water has been removed, the material is filtered yielding the desired product which is adjusted with additional mineral oil to form an oil solution containing 28.5% barium and about 43% mineral oil.

EXAMPLE 14

A mixture of 65 parts of commercially available mixture of aliphatic alcohols containing 12 to 18 carbon atoms, 141 parts of nonylphenol and 600 parts of mineral oil is prepared and purged with nitrogen to remove any oxygen present in the system. The nitrogen purge is maintained throughout the entire process. After a period of about 20 minutes, the mixture is heated while stirring to a temperature of from about 90° C. to about 98° C. At this temperature, 1200 parts of barium hydroxide monohydrate is added incrementally over a 30-minute period and the temperature of the mixture is then increased to about 150°-155° C. while removing any water which is driven off during the heating. Oleic acid (258 parts) is then added over a 30-40 minute period while again removing the water of reaction which comes over. After all of the oleic acid is added, the mixture is treated with carbon dioxide at a rate of about 2 SCFH for approximately 4 hours while monitoring the titratable basicity of the mixture. The base number of the final product is about 8.

EXAMPLE 15

The general procedure of Example 14 is repeated utilizing 325 parts of the alcohol mixture containing from 12 to 18 carbon atoms, 675 parts of a tall oil fatty acid, 1870 parts of mineral oil, 1840 parts of barium hydroxide monohydrate, and 281 parts of nonylphenol. At the end of the reaction, the filtrate is adjusted with mineral oil to provide a product containing 20.6% barium and a sulfate ash of 35.0%.

In some instances, it is desirable to post-treat the basic metal salts of alkyl phenols (B-1) and the basic metal salts of monocarboxylic acids (B-2) prepared utilizing phenols are promoters with at least one compound capable of displacing the hydrogen of any phenolic hydroxyl groups remaining in the product mixture. It has been observed that when the phenol-containing products are treated in this manner, improved color and color stability is obtained. A variety of compounds are capable of displacing the hydrogen of the phenolic hydroxyl group, and these include epoxy compounds, phosgene, diazomethane, metal alkoxides, metal sulfoxides, carbonates, isocyanates, etc. The amount of such compounds which is reacted with the phenol-containing basic products preferably is an amount which is sufficient to react and displace all of the hydrogens on the phenolic hydroxyl groups present.

Preferably, the above-described basic compositions are post-treated with at least one epoxide. Although any epoxy compound which is capable of reacting with the hydrogen atom of the phenolic hydroxyl group can be utilized beneficially, it generally is preferred that the epoxide be a low molecular weight epoxide such as ethylene oxide, propylene oxide, butylene oxide, epichlorohydrin, butyl epoxy stearate, glycidyl methacrylate, etc. Particularly preferred are the lower alkyl epoxides containing 7 carbons or less, and especially ethylene and propylene oxides.

The reaction between the compound capable of displacing hydrogen in the phenolic hydroxyl group such as the epoxides, and the basic compositions containing phenol is generally carried out at about from ambient temperature to about 200° C. The most convenient method is to introduce the epoxide gradually into the basic composition which is usually dissolved in a suitable non-polar solvent such as mineral oil, kerosene, or the like.

The following example illustrate the post-treatment of the basic compositions containing or derived from phenol with a reactive compound such as an epoxide.

EXAMPLE 16

The basic barium salt obtained in Example 14 is maintained in a nitrogen atmosphere and propylene oxide is fed into the composition (about 73 parts) over a period of about 30-40 minutes while maintaining the temperature of the reaction mixture at about 150° C. The mixture is then filtered while hot, and the filtrate is the desired product characterized by a base number of 10 and a barium content of 35%.

In addition to the epoxidized glycerides (A) and the hydrocarbon-soluble basic metal salts (B), the mixtures which are treated in accordance with the process of the present invention also contain (C) a hydrocarbon diluent. Such mixtures, even though including a hydrocarbon diluent are non-homogeneous mixtures but can be rendered homogeneous by heating at an elevated temperature until the mixture becomes homogeneous.

Generally, any hydrocarbon diluent can be employed, and the choice of diluent is dependent in part on the intended use of the mixture. Most generally, the hydrocarbon diluent will be a non-volatile diluent such as the various natural and synthetic oils of lubricating viscosity. The natural oils include animal oils and vegetable oils (e.g., castor oil, lard oil) as well as solvent-refined or acid-refined mineral lubricating oils of the paraffinic, naphthenic or mixed paraffinic-naphthenic types. Synthetic oils include hydrocarbon oils and halo-substituted hydrocarbon oils such as polymerized and interpolymerized olefins (e.g., polybutylenes, polypropylenes, propylene-isobutylene copolymers, chlorinated polybutylenes, etc.). Other classes of synthetic oils include alkylene oxide polymers and interpolymers and derivatives thereof; esters of dicarboxylic acids; silicon-based oils; etc. In most instances, the basic metal salts (B-1) and (B-2) are prepared from mixtures containing non-volatile hydrocarbon diluents such as mineral oil, and thus, the hydrocarbon diluent (C) in some instances, may be derived exclusively from the diluent present in said basic metal salts. In other words, the non-homogeneous mixture which is treated in accordance with the present invention is prepared by mixing (A) at least one epoxidized triglyceride with at least one oil solution of a hydrocarbon-soluble basic metal salt (B-1) and/or (B-2). Additional solvent can be added as desired. When the basic metal salt (B-1) and/or (B-2) and (C) comprise a hydrocarbon solution of the salt, such solutions may contain the metal in various concentrations. For example, hydrocarbon solutions of the metal salts (B-1) and/or (B-2) can be prepared containing from about 15 to about 45% barium. Other solutions can be prepared containing from about 5 to about 20% of calcium.

As mentioned previously the process of the present invention comprises heating a non-homogeneous mixture of the type described above to an elevated temperature until the mixture is homogeneous. Temperatures above about ambient temperature and more generally above 40° C. to as high as 150° C. or higher, although higher temperatures do not appear to be necessary or desirable. Generally, the mixture of components (A), (B) and (C) is heated to a temperature of about 80° C. for a period of about 0.5 hour. The temperature and time of heating can be readily determined by one skilled in the art and for each individual mixture. Once the mixture has been rendered homogeneous by heating, the mixture may be cooled to ambient temperature and retains the homogeneous nature. Moreover, the homogeneity of the mixture is maintained for extended periods of time.

The relative amounts of components (A), (B) and (C) incorporated into the mixture can be varied over a wide range and will be dependent upon the desired end use for the mixture once it has been rendered homogeneous. Generally, the weight ratio of component (A) to component (B) will vary from about 1:10 to about 10:1. The amount of hydrocarbon diluent (component (C)) present in the mixture will be a minor amount (e.g., up to about 20% by weight), and is an amount which results in a non-homogeneous mixture.

The following examples (except those identified as Control examples) illustrate the process of the present invention for preparing homogeneous mixtures.

CONTROL-1

A mixture of 12.3 parts of the product of Example 16 and 8 parts of epoxidized soybean oil (Drapex 6.8) is prepared at room temperature with stirring. The mixture remains non-homogeneous despite extended stirring, and does not become homogeneous when stirring is terminated and the mixture is allowed to stand at ambient temperature for an extended period of time.

CONTROL-2

A mixture of 47.6 parts of the oil solution prepared in Example 16 and 32 parts of epoxidized soybean oil is prepared at ambient temperature. This mixture remains non-homogeneous at ambient temperature even when stirred for an extended period of time.

EXAMPLE A

A sample of a non-homogeneous mixture obtained in Control-2 in a 4-ounce bottle is placed in an oven at a temperature of about 162° C. for about 30 minutes. The mixture becomes homogeneous.

EXAMPLES B-J

The procedure of Example A is repeated with the following mixtures which are initially non-homogeneous but become homogeneous on heating.

TABLE I

| Example | Basic Barium Salt | | Epoxidized Oil | | % Ba in Product |
|---|---|---|---|---|---|
| | Source | Amount(g) | Type | Amount(g) | |
| B | Example 13 | 30 | Soybean | 20 | 17.07 |
| C | Example 13 | 40 | Soybean | 10 | 22.76 |
| D | Example 13 | 45 | Soybean | 5 | 25.60 |
| E | Example 13 | 47.5 | Soybean | 2.5 | 27.03 |
| F | Example 16 | 30 | Soybean | 20 | 20.64 |
| G | Example 16 | 40 | Soybean | 10 | 27.52 |
| H | Example 16 | 45 | Soybean | 5 | 30.96 |
| I | Example 16 | 47.5 | Soybean | 2.5 | 32.68 |
| J | Example 13 | 14.4 | Soybean | 40 | 7.53 |

The liquid homogeneous stabilizer compositions prepared in accordance with the process of the present invention may contain in addition to the epoxidized glyceride (A) and the hydrocarbon-soluble basic alkali or alkaline earth metal salts (B-1) or (B-2) and (C) hydrocarbon diluent, (D) at least one neutral polyvalent metal salt of a carboxylic acid. In accordance with the procedure of the present invention, after the non-homogeneous stabilizer compositions have been rendered homogeneous in accordance with the present invention, one or more polyvalent metal salts of carboxylic acids can be blended into the homogeneous composition and the composition retains its homogeneity. The polyvalent metal salts which may optionally be used in addition to the above-described basic alkali or alkaline earth metal salts (B-1) and (B-2) are most often neutral metal salts of cadmium, zinc, zirconium, tin, calcium, strontium, or mixtures thereof, the preferred salts being cadmium salts and mixtures of cadmium and zinc salts.

The optional polyvalent metal salts generally will be salts of aliphatic or benzenoid monocarboxylic acids. The useful aliphatic acids are straight-chain and branched-chain alkanoic acids having from 2 to about 22 carbon atoms and preferably from about 6 to about 12 carbon atoms. Examples of the preferred aliphatic acids are caproic acid, 2-ethylhexanoic acid, caprylic, neooctanoic acid, neodecanoic acid, pelargonic acid, lauric acid, malmitic acid, myristic acid, stearic acid, behenic acid, oleic acid, linoleic acid, etc. Examples of aromatic carboxylic acids that can be utilized in the formation of the polyvalent metal salts include benzoic acid, ortho-, meta-, and para-toluic acid, ortho-, meta-, and para-ethylbenzoic acid, ortho-, meta-, and para-, butylbenzoic acid, chlorobenzoic acid, bromobenzoic acid and hydroxy benzoic acid. When included in the stabilizer systems of this invention, the neutral polyvalent metal salts generally will be present in amounts from about 1 to about 20% by weight.

The homogeneous stabilizer compositions of the present invention also may include (E) one or more organic phosphite. The organic phosphite useful in the stabilizer compositions of the present invention can be any organic phosphite having one or more organic groups attached to phosphorus through oxygen. More generally, the organic phosphite component of the stabilizer systems of the present invention generally will be secondary or tertiary phosphites having 2 or 3 organic groups attached to the phosphorus through oxygen, and most often, these groups are monovalent groups. Thus, the phosphites may be secondary phosphites such as diaryl phosphites, aryl alkyl phosphites and dialkyl phosphites, or tertiary phosphites, such as trialkyl phosphites, triaryl phosphites, dialkyl monoaryl phosphites and monoalkyl diaryl phosphites. Also useful are cyclic phosphites derived from pentaerithitol and other neopentyl polyhydric alcohols. A preferred group of phosphites are the trialkyl, triaryl, dialkyl monoaryl, and monoalkyl diaryl phosphites in which the alkyl groups are straight-chain or branched-chain groups having from about 3 to about 18 carbon atoms and preferably from about 4 to about 10 carbon atoms, and the aryl groups are phenyl groups or substituted phenyl groups in which the substituents are halogen, hydroxyl groups or alkyl groups having from 1 to about 12 carbon atoms. Specific examples of useful organic phosphites include: triphenyl phosphite, tri-(p-tert butylphenyl) phosphite, tri-(hydroxyphenyl) phosphite, diphenyl phosphite, diphenyl dodecyl phosphite, phenyl di-2-ethylhexyl phosphite, phenyl didecyl phosphite, di-(nonylphenyl) 2-chloroethyl phosphite, tridodecyl phosphite, trioctadecyl phosphite, and the like. Another preferred group of phosphites are the secondary phosphites that contain the aforementioned aryl and/or alkyl groups. These include, for example, diphenyl hydrogen phosphite, di(chlorophenyl) hydrogen phosphite, octaphenyl octyl hydrogen phosphite, phenyl decyl hydrogen phosphite, phenyl octadecyl hydrogen phosphite, di-2-ethylhexyl phosphite, and hexyl decyl phosphite. A single phosphite or a mixture of two or more of these compounds may be used.

When the non-homogeneous stabilizer compositions have been rendered homogeneous in accordance with the process of the present invention, it is also sometimes desirable to add volatile solvents to the stabilizer compositions of the present invention as a diluent prior to use as a stabilizer in vinyl halide polymers. Examples of solvents which can be utilized include the aliphatic, cycloaliphatic and aromatic hydrocarbons, the aliphatic, cycloaliphatic and aromatic alcohols, ether alcohols, and ether alcohol esters. Kerosene is an often used diluent in polymer stabilizer systems.

It also is desirable in some instances to add additional epoxidized soybean oil to the homogeneous compositions once they have been rendered homogeneous in accordance with the present invention. It has been observed in some instances that attempts to convert non-homogeneous liquids to homogeneous liquids containing large amounts of epoxidized triglycerides are not successful whereas a preliminary conversion of a mixture containing lesser amounts of epoxidized triglyceride and the basic metal salts to a homogeneous solution followed by the addition of the remaining epoxidized triglyceride results in a mixture containing the desirable amount of epoxidized triglyceride, and the mixture retains its homogeneity.

In addition to the afore-mentioned components, the stabilizer compositions of the present invention may contain other heat and light stabilizers such as organo tin compounds antioxidants, lubricants, peptizing agents and other additives that are ordinarily employed in the production of stabilizers for vinyl halide polymers.

The following examples illustrate the stabilizer compositions of the present invention containing components in addition to the epoxidized triglyceride and the basic alkali or alkaline earth metal salt. The following Examples K-M of homogeneous stabilizing compositions are obtained by first preparing a homogeneous clear solution of the indicated epoxidized triglyceride and basic alkali or alkaline earth metal salt in accordance with the method of the invention and thereafter blending the other components into the homogeneous mixture. In Examples K, L and M, described in Table II, the components are added in the order given in Table II at room temperature.

TABLE II

| Components | Example K[1] | L | M |
|---|---|---|---|
| Product of Example A | 19.9 | 19.9 | 19.9 |
| Cadmium Octoate[2] | 8.4 | 8.4 | 8.4 |
| Triphenyl phosphite (TPP) | 8.0 | 8.0 | 8.0 |
| Kerosene | 3.7 | 3.7 | 3.7 |
| Epoxidized Soybean Oil | — | 8.0 | 40.0 |
| Condition of Blend | | | |
| initial | clear | clear | clear |
| after 2.5 | clear | clear | clear |

TABLE II-continued

| Components | Example K[1] | L | M |
|---|---|---|---|
| months | | | |

[1]Numbers are weight in grams.
[2]Available from Synthetic Products, Inc. under general trade designation "SYN-PRON 1202".

Stabilizer compositions containing additional components such as phosphites and neutral metal salts can also be prepared from the homogeneous products of Examples B-I. The preparation of such stabilizer compositions is illustrated in Table III. In Examples N-U, the components are added in the order given in Table III at room temperature with stirring.

TABLE III

| Components Product of Example | Examples N | O | P | Q | R | S | T | U |
|---|---|---|---|---|---|---|---|---|
| B | 23.98 | | | | | | | |
| C | | 17.99 | | | | | | |
| D | | | 15.99 | | | | | |
| E | | | | 15.14 | | | | |
| F | | | | | 19.83 | | | |
| G | | | | | | 14.88 | | |
| H | | | | | | | 13.22 | |
| I | | | | | | | | 12.53 |
| Kerosene | — | 5.61 | 7.61 | 8.46 | 3.77 | 8.72 | 10.38 | 11.07 |
| Cadmium octoate | 8.4 | 8.4 | 8.4 | 8.4 | 8.4 | 8.4 | 8.4 | 8.4 |
| Triphenyl phosphite (TPP) | 8.0 | 8.0 | 8.0 | 8.0 | 8.0 | 8.0 | 8.0 | 8.0 |
| Results | | | | | | | | |
| Initial cond. | clear | → | → | → | → | → | → | clear |
| overnight | clear | → | → | → | → | → | cldy. | cldy. |
| one week | clear | → | → | → | → | → | cldy. | cldy. |
| two months | clear | → | → | → | sl. cldy. | sl. cldy. | cldy. | cldy. |

EXAMPLE V

A homogeneous stabilizer composition is prepared from the composition of Example J by adding to the stirred product of Example J, 9.21 grams of kerosene, 8.4 grams of cadmium octoate and 8.0 grams of triphenyl phosphite in that order. This composition contains a large amount of the epoxidized soybean oil which is desired in vinyl halide stabilization, and the composition is homogeneous.

The homogeneous stabilizer compositions of the invention are readily adaptable for use as stabilizers in plastic formulations such as vinyl halide polymers and copolymers as well as other polymers such as polyethylene, polyisobutylene, polystyrene, copolymers of isobutylene with isoprene, butadiene, styrene and the like.

Vinyl halide polymers and other halogen containing resins that can be stabilized with the basic alkali and alkaline earth metal salt composition of this invention include polyvinylchloride, polyvinylbromide, polyvinylfluoride, polyvinylidenechloride, chlorinated polyethylene, chlorinated polypropylene, brominated polyethylene, rubber hydrochloride, vinylchloride-vinylacetate copolymer, vinylchloride-ethylene copolymer, vinylchloride propylene copolymer, vinylchloridestyrene copolymer, vinylchloride-isobutylene copolymer, vinylchloride-vinylidenechloride copolymer, vinylchloride-styrene-acrylonitrile-terpolymer, vinylchloride-butadiene copolymer, vinylchloride-isoprene copolymer, vinylchloride-chlorinated propylene copolymer, vinylchloride-vinylidenechloride-vinylacetate terpolymer, vinylchloride-ethyl-acrylate copolymer, vinylchloride-maleate-copolymer, vinylchloride-methylmethacrylate copolymer, vinylchloride-acrylonitrile copolymer, internally plasticized polyvinylchloride, and blends of the above halogen-containing resin and alpha-olefin polymers. The terms "polyvinylchloride" and "vinyl chloride polymer" as used herein include any polymer formed at least in part of the recurring group,

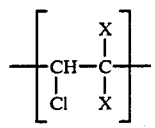

and having a chlorine content of excess of 40%. In this group, the X groups can each be either hydrogen or chlorine. In polyvinyl chloride homopolymers, each of the X groups is hydrogen. Thus, the term includes not only polyvinyl chloride homopolymers but also afterchlorinated polyvinyl chlorides as a class, for example, those disclosed in British Pat. No. 893,288 and also copolymers of vinyl chloride in a major proportion and other copolymerizable monomers in a minor proportion, as already mentioned.

The invention also is applicable to mixtures of polyvinyl chloride in a major proportion with a minor proportion of other synthetic resins such as chlorinated polyethylene or copolymers of acrylonitrile with butadiene and styrene.

In addition to the homogeneous stabilizer compositions of this invention described above, the stabilized vinyl halide polymer compositions may contain other additives such as pigments, dies, processing aids, impact modifiers, extenders, and lubricants, the amount is ordinarily employed for the purposes indicated.

The vinyl halide polymers stabilized with the compositions of the present invention may be prepared by any suitable and convenient procedure. Such procedures include dry blending with a conventional mix such as a Henschel blender, mixing on a two or three roll heat mill, and tumbling.

The amount of the stabilizer compositions of the present invention utilized in stabilizing polymer compositions, especially vinyl halide polymer compositions, is an amount which is sufficient to provide the desired stabilizing properties. The amount of the homogeneous compositions of the present invention added to vinyl halide polymers also will be dependent upon the relative amounts of the various components contained in the homogeneous composition, and such amounts can be readily determined by one skilled in the art of vinyl halide formulations. In general, vinyl halide polymers may be formulated to contain from about 0.1 to about 10 parts by weight per 100 parts of vinyl halide polymer, of the stabilizer compositions of the present invention, and the stabilizer compositions generally will comprise from about 1% to about 20% by weight of the neutral polyvalent metal and 1% to about 20% by weight of phosphorus per part by weight of the basic metal salt.

The utility of the homogeneous stabilizer compositions of the present invention is demonstrated by the following examples wherein the compositions of the invention are utilized as stabilizers in the vinyl halide formulation comprising 200 grams of GEON 30, 100 grams of dioctylphthalate and 0.5 gram of stearic acid.

The stabilizers in Examples II-V are premixed and thereafter blended with the GEON 30 mixture until uniform. The formulation is process on a two roll mill for 10 minutes; the front roll is maintained at about 160° C. and the back roll at about 150° C. The vinyl halide formulations prepared in this manner are identified in the following Table IV. The initial color of the vinyl halide polymers formed in this manner is observed and recorded in Table IV. The heat stability of the vinyl halide polymers obtained in Examples I-V is observed and is summarized also in Table IV.

TABLE IV

Comparison of Vinyl Halide Systems

| Example | Stabilizer Source | Amount(g) | Initial Color |
|---|---|---|---|
| I | Prod. of Ex. J | 810 | clear |
| II | Prod. of Ex. 13 | 1.44 | |
| | Cd Octoate | 0.84 | |
| | T.P.P. | 0.80 | |
| | Epox. Soybean | 4.00 | clear |
| III | Prod. of Ex. R | 4.00 | |
| | Epox. Soybean | 4.00 | clear |
| IV | Prod. of Ex. 16 | 1.20 | |
| | Cd Octoate | 0.84 | |
| | T.P.P. | 0.80 | |
| | Epox. Soybean | 4.00 | clear |
| V | Barium Octoate | 2.56 | |
| | Cd Octoate | 0.84 | |
| | T.P.P. | 0.80 | |
| | Epox. Soybean | 4.00 | clear |

| Example | Heat Stability (180° C.)* | | | |
|---|---|---|---|---|
| | 15 min. | 30 min. | 60 min. | 120 min. |
| I | clear | v.sl.yel. | sl.yel. | yel. |
| II | clear | v.sl.yel. | sl.yel. | yel. |
| III | clear | v.sl.yel. | sl.yel. | yel. |
| IV | clear | v.sl.yel. | sl.yel. | yel. |
| V | clear | clear | sl.yel. | yel. |

*Heat stability is run on 0.060" milled sheets of polymer in oven test.

I claim:

1. A process for preparing liquid homogeneous stabilizer compositions for vinyl halide polymers which comprises heating a non-homogeneous mixture comprising
   (A) at least one epoxidized glyceride wherein the glyceride is represented by the formula

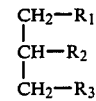

wherein $R_1$, $R_2$ and $R_3$ are each independently hydroxy or fatty acid groups of from about 12 to about 30 carbon atoms with the proviso that at least one of $R_1$, $R_2$ and $R_3$ is a fatty acid group,
   (B) at least one hydrocarbon-soluble
   (B-2) basic alkali or alkaline earth metal salt of a monocarboxylic acid, and
   (C) a hydrocarbon diluent, at an elevated temperature until the mixture is homogeneous.

2. The process of claim 1 wherein the basic salt (B-2) is prepared utilizing a phenol as a promoter.

3. The process of claim 2 wherein the basic salt (B-2) has been post-treated with at least one compound capable of displacing the hydrogen of the phenolic hydroxyl group.

4. The process of claim 3 wherein the compound capable of displacing the hydrogen is an epoxide.

5. The process of claim 4 wherein the epoxide is ethylene oxide or propylene oxide.

6. The process of claim 1 wherein the metal (B-2) are alkaline earth metal salts.

7. The process of claim 1 wherein the metal (B-2) are barium or calcium salts.

8. The process of claim 1 wherein the glyceride is a triglyceride.

9. The process of claim 1 wherein the epoxidized glyceride is an epoxidized vegetable oil.

10. The process of claim 1 wherein the basic metal salt (B-2) is obtained by preparing a mixture comprising
    (a) at least one aliphatic or aromatic monocarboxylic acid,
    (b) more than one equivalent of at least one alkali metal or alkaline earth metal base per equivalent of said acid, and
    (c) at least one promoter selected from the group of aliphatic alcohols, alkyl phenols, or mixtures thereof and thereafter treating said mixture with an acidic gas until the titratable basicity (phenolphthalein indicator) of the mixture has been substantially reduced.

11. The process of claim 10 wherein the monocarboxylic acid (a) is selected from the group consisting of aliphatic monocarboxylic acids containing an average of from about 6 to about 30 carbon atoms and alkyl aromatic acids having one or more alkyl groups wherein the total number of carbon atoms in the alkyl group or groups is at least about 6.

12. The process of claim 11 wherein (a) is an aliphatic monocarboxylic acid.

13. The process of claim 12 wherein the monocarboxylic acid is a fatty acid.

14. The process of claim 10 wherein (c) is a mixture of an aliphatic alcohol and an alkyl phenol.

15. The process of claim 10 wherein the aliphatic alcohol (c) contains from one to about 30 carbon atoms.

16. The process of claim 14 wherein the alkyl phenol contains one or more alkyl groups containing a total of from about 6 to about 150 carbon atoms.

17. The process of claim 10 wherein the base (b) is an alkaline earth metal base.

18. The process of claim 17 wherein the alkaline earth metal base is a barium base.

19. The process of according to claim 10 wherein the ratio of equivalents of the alkaline earth metal base (b) to the combination of components (a) and (c) is at least about 3:1.

20. The process of claim 10 wherein the acidic gas is sulfur dioxide or carbon dioxide.

21. The process of claim 10 wherein the acidic gas is carbon dioxide.

22. A process for preparing a liquid homogeneous stabilizer composition for vinyl halide polymers which comprises heating a non-homogeneous mixture comprising
    (A) at least one epoxidized vegetable oil,
    (B-2) at least one hydrocarbon-soluble basic alkaline earth metal salt of an aliphatic or aromatic monocarboxylic acid, and
    (C) a non-volatile hydrocarbon diluent, at an elevated temperature until the mixture is homogeneous.

23. The process of claim 22 wherein the basic salt (B-2) is prepared utilizing as a promoter an alkyl phenol, an aliphatic alcohol, or mixtures thereof.

24. The process of claim 22 wherein the basic alkaline earth metal salt (B-2) is obtained by preparing the mixture comprising
    (a) at least one aliphatic or aromatic monocarboxylic acid,
    (b) more than one equivalent of at least one alkaline earth metal base per equivalent of said acid, and
    (c) at least one aliphatic alcohol, alkyl phenol, or mixtures thereof, heating the mixture to an elevated temperature, and thereafter treating said mixture with carbon dioxide until the titratable basicity (phenolphthalein indicator) of the mixture has been substantially reduced.

25. The process of claim 24 wherein the basic salt (B-2) is post-treated with at least one compound capable of displacing the hydrogen from the phenolic OH group.

26. The process of claim 22 wherein the alkaline earth metal salt is a barium or calcium salt.

27. The process of claim 24 wherein the metal base (b) is a barium base, and the mixture is heated to a temperature in excess of 100° C. to remove at least some of the water present in the mixture.

28. The process of claim 24 wherein (a) is an aliphatic monocarboxylic acid containing an average of from about 6 to about 30 carbon atoms.

29. The process of claim 28 wherein the monocarboxylic acid is a fatty acid.

30. The process of claim 24 wherein the phenol contains one or more alkyl groups containing a total of from about 6 to about 150 carbon atoms.

31. The process of claim 24 wherein the ratio of equivalents of the alkaline earth metal base (b) to the combination of components (a) and (c) is at least about 3:1.

32. The process of claim 22 wherein the mixture of components (A), (B-2) and (C) is heated to a temperature of from about 40° C. to about 150° C.

33. A stabilizer composition prepared in accordance with the process of claim 1.

34. A stabilizer composition prepared in accordance with the process of claim 22.

35. A stabilizer composition prepared in accordance with the process of claim 24.

36. A homogeneous stabilizer composition for vinyl halide polymers which comprises a mixture of the composition of claim 23, (D) at least one neutral polyvalent metal salt of a carboxylic acid and/or (E) at least one organic phosphite.

37. A homogeneous stabilizer composition for vinyl halide polymers which comprises a mixture of the composition of claim 34, (D) at least one neutral polyvalent metal salt of a carboxylic acid and/or (E) at least one organic phosphite.

38. A homogeneous stabilizer composition for vinyl halide polymers which comprises a mixture of the composition of claim 35, (D) at least one neutral polyvalent metal salt of a carboxylic acid and/or (E) at least one organic phosphite.

39. The composition of claim 36 wherein the polyvalent metal salt (E) is a substantially neutral cadmium, zinc, zirconium, tin or calcium salt of an aliphatic or aromatic carboxylic acid or mixtures thereof.

40. The composition of claim 36 wherein the mixture comprises from about 1% to about 20% by weight of the polyvalent metal, and 1% to about 20% by weight of phosphorus per part by weight of the basic metal salt.

41. The composition of claim 40 wherein the mixture also contains up to about 20% by weight of additional hydrocarbon solvent.

42. The composition of claim 36 wherein the polyvalent metal salt (E) is a cadmium salt of an aliphatic monocarboxylic acid containing from 2 to 22 carbon atoms.

43. The composition of claim 36 wherein the organic phosphite is a secondary or tertiary alkyl, aryl or alkyl aryl phosphite.

44. The composition of claim 36 wherein the phosphite is selected from the group consisting of secondary and tertiary aryl, alkyl, and alkyl aryl phosphites in which the alkyl groups have from about 3 to about 18 carbon atoms and the aryl groups are phenyl, alkyl phenyl, halo phenyl or hydroxy phenyl groups.

45. The vinyl halide polymer composition comprising a vinyl halide polymer and a stabilizing amount of the homogeneous stabilizer composition of claim 33.

46. The vinyl halide polymer composition comprising a vinyl halide polymer and a stabilizing amount of the homogeneous stabilizer composition of claim 34.

47. The vinyl halide polymer composition comprising a vinyl halide polymer and a stabilizing amount of the homogeneous stabilizer composition of claim 35.

48. The vinyl halide polymer of claim 45 containing from about 0.1 to about 10 parts by weight per 100 parts of said vinyl halide polymer of the stabilizer composition.

49. The vinyl halide polymer of claim 46 containing from about 0.1 to about 10 parts by weight per 100 parts of said vinyl halide polymer of the stabilizer composition.

* * * * *